No. 644,704. Patented Mar. 6, 1900.
A. L. DUDLEY.
METALLIC PACKING.
(Application filed May 16, 1898.)
(No Model.)
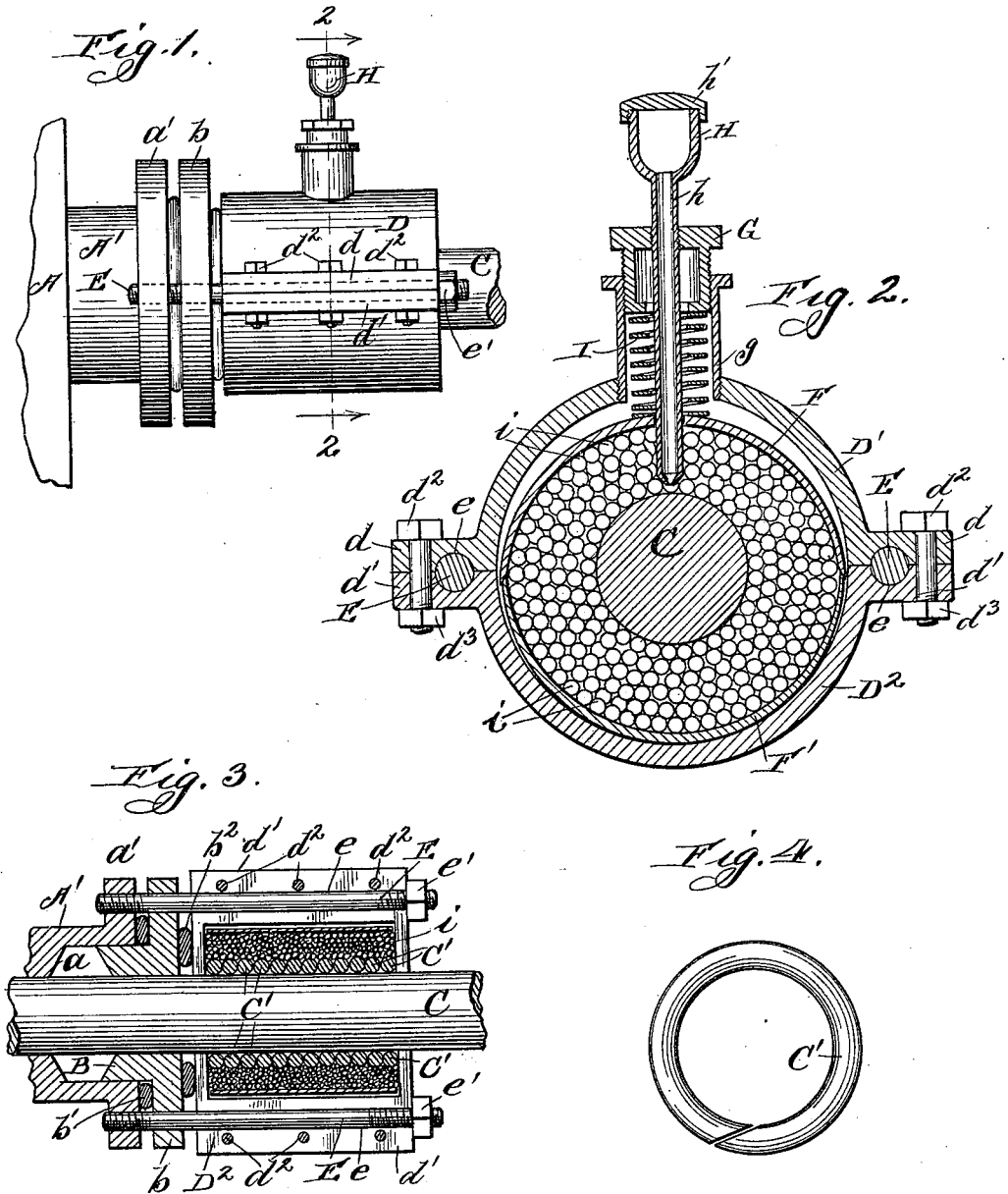
Witnesses:
W. J. Jacker.
E. A. Duggan.
Inventor:
Archie L. Dudley
By Chas. C. Tillman, Atty.

UNITED STATES PATENT OFFICE.

ARCHIE L. DUDLEY, OF CHICAGO, ILLINOIS.

METALLIC PACKING.

SPECIFICATION forming part of Letters Patent No. 644,704, dated March 6, 1900.

Application filed May 16, 1898. Serial No. 680,802. (No model.)

*To all whom it may concern:*

Be it known that I, ARCHIE L. DUDLEY, a citizen of the United States, residing at Chicago, in the county of Cook and State of Illinois, have invented certain new and useful Improvements in Metallic Packing, of which the following is a specification.

This invention relates to improvements in metallic packing for piston-rods or other reciprocating or revolving rods, spindles, or stems; and it consists in certain novel details of construction and combination and arrangement of parts, as will hereinafter be more fully set forth and specifically claimed.

One object of my invention is to construct and arrange the packing so that a tight and hermetical joint is constantly secured between the rod, spindle, or stem and the cylinder or other vessel or part which contains the steam or other element under pressure and at the same time to reduce the friction incident to the packing.

Another object of my invention is to provide a self oiling and adjusting construction of packing which may be used in connection with the ordinary packing or stuffing boxes adapted for fibrous or other packing without material change of construction in said boxes.

Other objects and advantages will appear in the following description.

In order to enable others skilled in the art to which my invention pertains to make and use the same, I will now proceed to describe it, referring to the accompanying drawings, in which—

Figure 1 is a view in side elevation of a portion of a steam-cylinder and a piston-rod with my packing in position thereon. Fig. 2 is an enlarged sectional view taken on line 2 2 of Fig. 1 looking in the direction indicated by the arrows. Fig. 3 is a view, partly in section and partly in elevation, of a portion of a piston-rod, and an ordinary stuffing-box with my packing in position, showing a modification in its construction; and Fig. 4 is a plan view of one of the rings used in said modification.

Similar letters refer to like parts throughout the different views of the drawings.

A represents a portion of a steam-cylinder or other vessel which holds or contains steam or other element under pressure and is provided, as usual, with a stuffing-box A', of the ordinary or any preferred construction. This stuffing-box is formed or provided with a cavity $a$, in which the gland or follower B fits. The box A' is also provided with an annular flange $a'$, between which and the flange $b$ on the follower B is located a ring or gasket $b'$, of any suitable material, to afford a tight joint and to prevent the escape of steam and the like. Passing through the gland B is a piston-rod, stem, or spindle C, around and on which is placed and secured the packing, which comprises a cylindrical casing D, usually made in two semicircular sections D' and D², which are provided, respectively, with flanges $d$ and $d'$, secured together by means of bolts $d^2$ and nuts $d^3$ or otherwise. The adjacent surfaces of the flanges $d$ and $d'$ are formed with recesses $e$ to receive the rods E, which are screw-threaded at their ends to engage nuts $e'$ at their outer ends and suitable openings in the flanges of the gland and stuffing-box, as is clearly shown in Figs. 1 and 3 of the drawings. The ends of the sections D' and D², composing the cylinder D, are provided with suitable openings for the reception and operation of the piston-rod C or spindle or stem. One of the sections comprising the cylindrical casing D is formed or provided with a tubular opening $g$, in whose outer portion is screwed or otherwise fitted a hollow cap G, through which passes and engages therewith the stem $h$ of an oil-cup H, which may be provided with a cap $h'$ or other suitable covering. Within the cylindrical casing D is located an adjusting-casing, which comprises two sections F and F', of flexible material and substantially semicircular in shape. The edges of one of these sections is provided with an outward bevel, while the edges of the other section is provided with an inward bevel, so that when the edges of the two sections impinge one another and are placed under pressure by means of the spring I, which is located within the tubular portion $g$ of the cylindrical casing D and rests on one of the sections of the adjusting-casing, the cavity of the adjusting-casing will be reduced in size, thus forcing the balls or small spheres $i$, which are located around the rod C, closely together, and thus causing them to form a close yet antifrictional joint.

It will be observed that one of the sections of the adjusting-casing will rest against the inner surface of the cylindrical casing D, while the other section will be held a distance therefrom by means of the spring I, thus affording a vibrating space between the two casings.

In Fig. 3 of the drawings I have shown a modification in the construction of my packing, which consists in encircling the rod C with a series of broken rings C', whose meeting ends are inclined, as shown in Fig. 4 of the drawings, so that they may spread or be pressed against the rod which they surround by the action of the spring I on the adjusting-casing, which, as well as the balls or small spheres $i$, are employed, as in the first-described construction, as adjustable filling-pieces. Between the cylindrical casing D and the flange $b$ of the gland is located a gasket or ring $b^2$, of any suitable material.

When it is desired to replenish the adjusting-casing with balls or small spheres, which may become necessary by reason of wear, the stem $h$ of the oil-cup may be removed from the cap or plug G and the shot or balls inserted through the opening therefor.

In using my packing it is evident that the balls or shot $i$ will adjust themselves within the adjusting-casing against the rod or against the rings C', when the modification illustrated in Fig. 3 of the drawings is employed, in such a manner as to afford a hermetical joint, yet one that will avoid a great amount of friction. It is also evident that oil may be admitted through the packing to the rod through the stem of the oil-cup, which may be supplied with waste or other material, if desired.

Having thus fully described my invention, what I claim as new, and desire to secure by Letters Patent, is—

1. The combination with a cylindrical casing having a tubular opening, of an adjusting-casing comprising two semicircular sections and located within the cylindrical casing, a quantity of shot or balls located within the adjusting-casing, a spring located within the tubular opening of the cylindrical casing and resting against one portion of the adjusting-casing, a plug or cap secured in the outer portion of the said tubular opening, and an oil-cup having a stem passing through the said block and into the adjusting-casing, substantially as described.

2. The combination with the stuffing-box A', of the gland B, fitting therein, a cylindrical casing secured to the stuffing-box and gland, an adjusting-casing located within the cylindrical casing and composed of two semicircular sections, adjustable filling-pieces located within the adjusting-casing, and means to force the sections of the adjusting-casing toward each other, substantially as described.

Signed at Chicago, Illinois, this 12th day of May, 1898.

ARCHIE L. DUDLEY.

Witnesses:
CHAS. C. TILLMAN,
E. A. DUGGAN.